United States Patent [19]

Bothwell

[11] Patent Number: 5,632,622

[45] Date of Patent: May 27, 1997

[54] METHOD AND APPARATUS FOR SIMULATOR CONTROL

[75] Inventor: Robert L. Bothwell, Fort Worth, Tex.

[73] Assignee: Lockheed Corporation, Fort Worth, Tex.

[21] Appl. No.: 428,908

[22] Filed: Apr. 25, 1995

Related U.S. Application Data

[63] Continuation-in-part of Ser. No. 326,709, Oct. 20, 1994.
[51] Int. Cl.$^6$ .............................. G09B 9/02; G09B 19/16
[52] U.S. Cl. .................. 434/29; 434/30; 434/49; 434/372
[58] Field of Search ................... 434/14, 28, 30, 434/38, 43–45, 49, 55, 59, 307 R, 308, 365, 372; 340/945; 364/578; 345/146

[56] References Cited

U.S. PATENT DOCUMENTS

| | | | |
|---|---|---|---|
| 4,587,630 | 5/1986 | Straton et al. | 345/146 |
| 4,710,128 | 12/1987 | Wachsmuth et al. | 434/30 X |
| 4,767,334 | 8/1988 | Thorne et al. | 434/29 |
| 4,845,495 | 7/1989 | Bollard et al. | 340/945 X |
| 4,845,645 | 7/1989 | Matin et al. | 434/372 X |
| 5,017,141 | 5/1991 | Relf et al. | 434/30 X |
| 5,051,094 | 9/1991 | Richter et al. | 434/30 |
| 5,224,861 | 7/1993 | Glass et al. | 434/30 X |
| 5,286,202 | 2/1994 | de Gyarfas et al. | 434/29 X |

OTHER PUBLICATIONS

Military Forum, Sep., 1989—"A New Look for Part-Task Trainers" (pp. 23–24) by Lawrence C. Grossman.
Advanced Imaging, Nov., 1994 "From Image-Exploiting Military Simulation to Live Entertainment" (pp. 56–58) by Francis Hamit.
Advanced Imaging, Nov., 1994 "Touchscreen Displays: Broadening Applications Push New Capabilities" (pp. 64–67) by John Carlson.

*Primary Examiner*—Joe Cheng
*Attorney, Agent, or Firm*—Baker & Botts, L.L.P.

[57] ABSTRACT

A method and an apparatus for simulator control include a training system (10) with indicators and controls (12) for interfacing with a trainee. A display (16) is used to display representations of preprogrammed units, each unit including a collection of detailed parameters for use with a selected training scenario. Selection of one of the representations results in configuring the training system (10) according to the detailed parameters of the unit associated with the selected representation.

20 Claims, 7 Drawing Sheets

METHOD AND APPARATUS FOR SIMULATOR CONTROL

RELATED APPLICATIONS

This application is a continuation-in-part of U.S. patent application Ser. No. 08/326,709, filed Oct. 20, 1994 and entitled "Method and Apparatus for Training," which is herein incorporated by reference.

TECHNICAL FIELD OF THE INVENTION

This invention relates generally to training systems, and more particularly to a method and apparatus for simulator control.

BACKGROUND OF THE INVENTION

In many situations it is either impractical or impossible to provide training in the actual working environment. For example, with jet aircraft, training of new pilots and continued training of more experienced pilots cannot practically be accomplished with the aircraft itself.

Therefore, training simulators, such as flight simulators, have been developed. Ideally, such training systems provide exact replicas of the actual working environment, and provide real-life audio-visual experiences. Simulators are useful in a wide range of applications, such as for training in aircraft, boats, automobiles, trucks, buses, trains, power plants, chemical plants, or any other application calling for operator training.

These training systems typically include switches, buttons, gauges, meters, and other controls (which may be actual or computer representations) for simulating the actual controls used in the working environment. For training systems such as those used for jet aircraft, a visual display of ground terrain, the horizon, and the sky is also provided. In operation, these training systems simulate actual conditions in response to the trainees' use of the simulator controls. In this way, valuable training may be provided without the cost associated with, for example, actually flying a jet aircraft.

Instructors are often involved in the use of such training systems. These instructors monitor trainee performance, and can provide testing, instruction, and critique. For example, by setting the training system into a preset state, a trainee may be tested for response to a particular scenario, for example, recovery from a tailspin. However, instructors are not always necessary, and trainees may also set the training system to a desired state.

Establishing a particular training scenario involves setting the values of various parameters used by the training system. For example, with a flight simulator, these parameters include weather conditions, initial location of the aircraft (e.g., as on the runway or already in flight), and weapons load, among many other parameters.

In existing systems, setting of the various parameters for a training session often involves tedious and time consuming entry of data. For example, to change the simulated weather of a particular training scenario, prior art systems require the entry of a myriad of data values related to the weather, which often takes on the order of fifteen minutes to an hour to complete.

Because it is often desirable to provide a trainee with training on a number of different training scenarios, such delays in setting up the different scenarios result in significant amounts of wasted time, inefficient use of the training system, and less productive training sessions.

Therefore, a need has arisen for a method and an apparatus for controlling simulators that allow for quick and efficient changing of training scenarios.

SUMMARY OF THE INVENTION

Therefore, in accordance with the teachings of the present invention, a method and apparatus for simulator control are provided which substantially eliminate or reduce disadvantages and problems associated with prior art simulators.

In particular, a training system is provided in which a trainee interface interfaces the training system with the trainee. A processor is coupled to the trainee interface and executes a training program to control the training system. A display is coupled to the processor and displays representations of preprogrammed units. Each unit includes a collection of detailed parameters for use with a selected training scenario, such that selection of one of the representations results in configuring the training system according to the detailed parameters of the unit associated with the selected representation. In a particular embodiment, at least one of the units includes a collection of weather parameters.

Also provided is a method of training which includes interfacing a training system with a trainee, and displaying representations of preprogrammed units, each unit including a collection of detailed parameters for use with a selected training scenario. Selecting one of the representations results in configuring the training system according to the detailed parameters of the unit associated with the selected representation.

An important technical advantage of the present invention is the fact that preprogrammed units which include collections of detailed parameters are graphically represented on a display. Selection of these preprogrammed units results in quick and efficient control of training systems. Training is made more effective since training scenarios can be quickly adjusted according to the preprogrammed units, instead of having to wait for changing the training scenarios by tedious input of detailed information.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
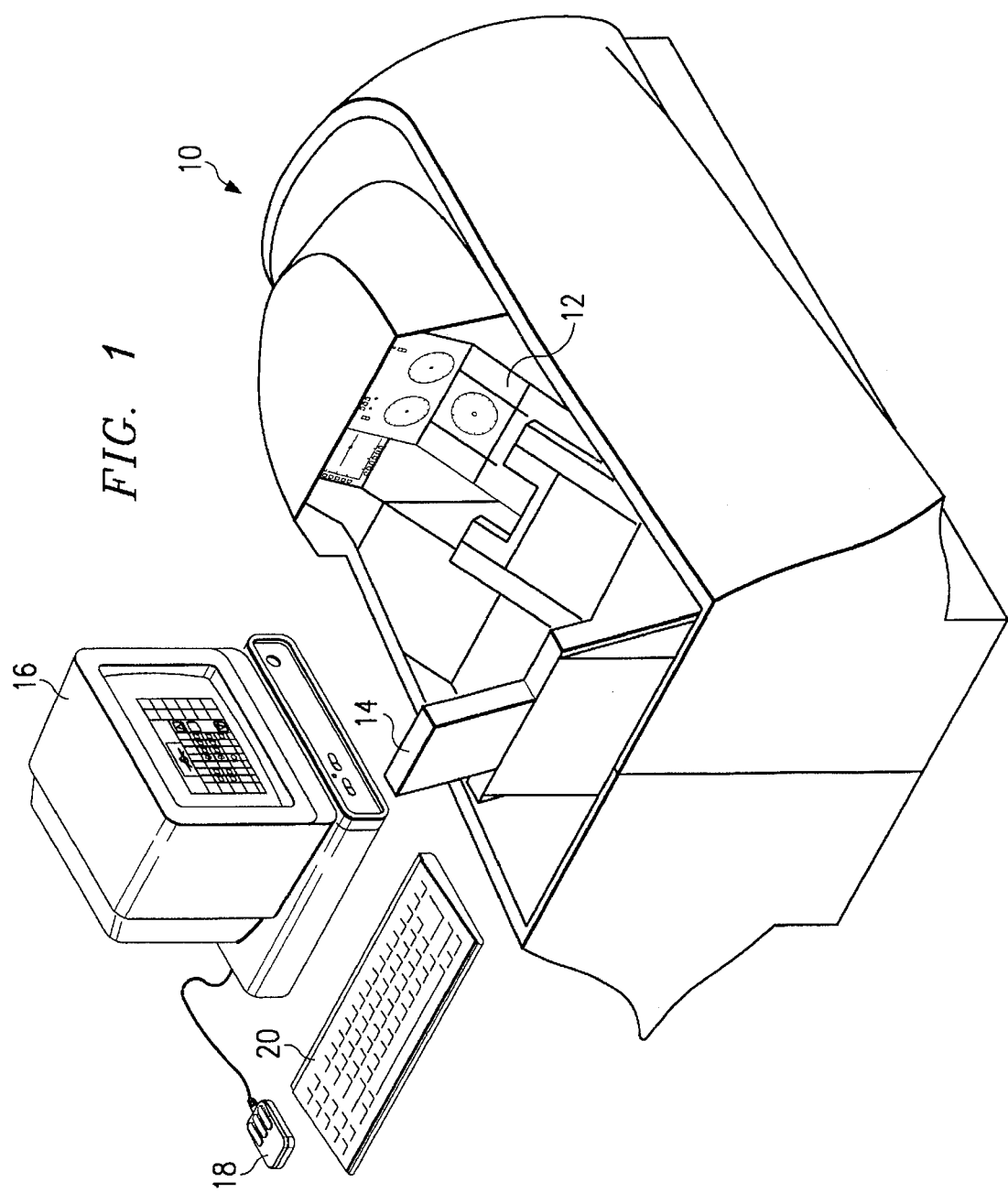
FIG. 1 illustrates an exemplary training system.

FIG. 1 illustrates an exemplary training system according to the teachings of the present invention. As shown in FIG. 1, a training system 10 includes operator indicators and controls 12 and trainee seat 14. The indicators and controls are an interface between the training system 10 and the trainee. Also included within training system 10 is display 16. More than one display may also be used. Display 16 may comprise a touch screen, as will be discussed below. Training system 10 is controlled in part by interaction with a graphical user interface on display 16. This interaction may be accomplished through use of a touch screen, a mouse 18, a keyboard 20, or any other input device, or combination of such devices. Those shown in FIG. 1 are exemplary only.

As shown in FIG. 1, an example of training system is a flight simulator, which is configured as a cockpit. This particular example is illustrative only, and the present invention may include many other types of training systems without departing from the intended scope herein. For example, the present invention may include training systems for power plants, boats, buses, trucks, or any other application that may call for operator training through the use of training systems.

The use of touch screens with the present invention is most advantageous, as trainees often wear gloves to simulate actual conditions. These gloves may make it difficult to operate a mouse, keyboard, or other input. However, it should be understood that touch screens need not be used, and the present invention can be implemented with such other input devices.

Figure 2:
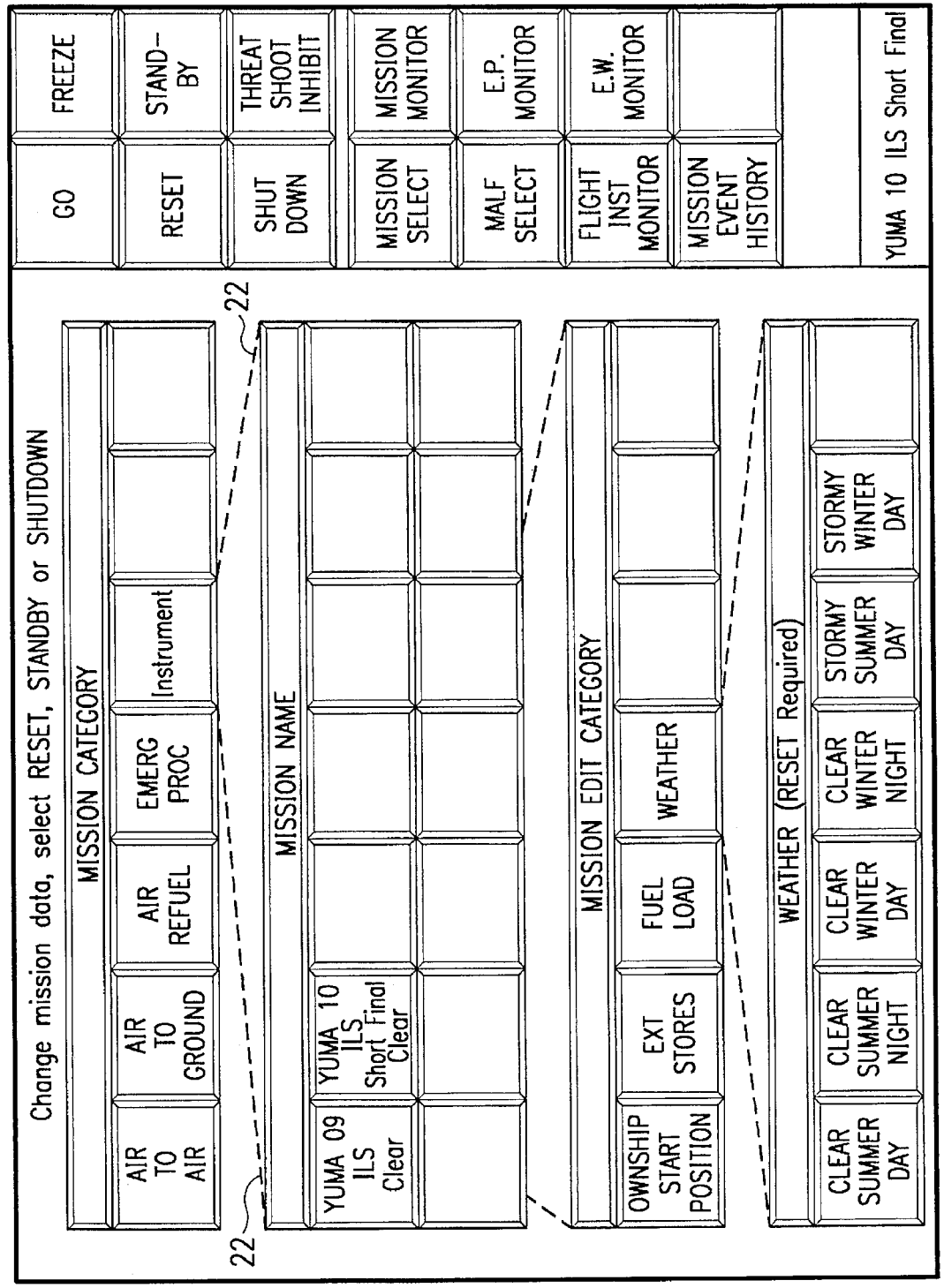
FIG. 2 illustrates a user interface allowing for changes in simulated weather conditions according to the teachings of the present invention.

FIGS. 2-5 illustrate the display of a particular example of a user interface according to the teachings of the present invention. These displays are displayed on display 16 of FIG. 1. The particular example shown in FIGS. 2-5 is in connection with a flight simulator, it being understood that the user interface of the present invention can be used with many other types of simulators. As shown in FIG. 2, the user interface of the present invention includes a hierarchal ordering of training scenario parameters. The highest level relates to the general nature of the training scenario. In a particular example shown in FIG. 2, this highest level is designated "mission category," and includes general categories of training missions. For example, the categories shown in FIG. 1 include air-to-air scenarios, air-to-ground scenarios, air refueling scenarios, emergency procedure scenarios, and instrument scenarios.

After selection of a choice from the highest level (e.g., one of the mission categories), the next hierarchal level will be accessed. This second set of displayed choices correspond to different training scenarios falling under the selected category. In the example shown in FIG. 2, two particular missions are available under the selected "instrument" mission category.

As can be seen in FIG. 2, the user interface of the present invention also includes graphical techniques for highlighting choices. The particular choices may appear as icons or "buttons," or any other graphical or textual indicator. A selected choice is highlighted, such as by changing the color or shading of the selected choice, or by making the choice appear depressed or extended. Items are selected through use of most any suitable input device, such as a touch screen, computer mouse, keyboard, light pen, and voice command system, among others. The choices falling under a selected item are graphically related to the selected item through the use of dashed lines, such as the dashed lines 22 shown in FIG. 2.

Once the general training scenario has been selected, through the use of the first and second hierarchal levels discussed above, the particular details of the training scenario must then be established. The present invention includes preprogramming of these details into selectable units or "packages," to provide a quick and efficient way of setting the detailed parameters of a particular training scenario. The preprogramming of these detailed parameters into selectable units provides a significant advantage of the present invention, since training scenarios can be quickly changed to provide a trainee with exposure to a multitude of different training scenarios without having to wait for the laborious entry of the individual detailed parameters.

To assist in choosing the preprogrammed units, various units are grouped into edit categories. In the example of FIG. 2, these edit categories fall under the "mission edit" heading, and include ownship start position (starting position of the aircraft in the scenario), external stores (weapons loading), fuel loading, and weather. FIG. 2 illustrates a particular example where weather is chosen as the category to be edited.

In prior art systems, changing simulated weather involves detailed entry of weather data, such as wind direction, wind speed, temperature, temperature gradients, and many other factors, often for different altitudes. With the present invention, such conditions are prepackaged into a limited number of units. In the example shown in FIG. 2, these units are represented on the display and include "CLEAR SUMMER DAY," "CLEAR SUMMER NIGHT," "CLEAR WINTER DAY," "CLEAR WINTER NIGHT," "STORMY SUMMER DAY," and "STORMY WINTER DAY." Each unit includes a collection of all the detailed parameters necessary to appropriately configure the training system. By selecting one of these units, the training system is quickly configured for new simulated weather conditions, and efficient training can continue.

Also shown in FIG. 2 (on the right side of the display) are various icons (or buttons) for "general" commands that may be used for general control or operation of the training system 10. For example, the go and freeze buttons can be used to start and stop a particular flight simulation, for example, by a trainee or by an instructor who may desire to periodically stop the flight simulation to provide critique or instruction. These "general" buttons are exemplary only, and need not be included. The function of the "general" buttons will depend upon the type of training system involved.

Figure 3:
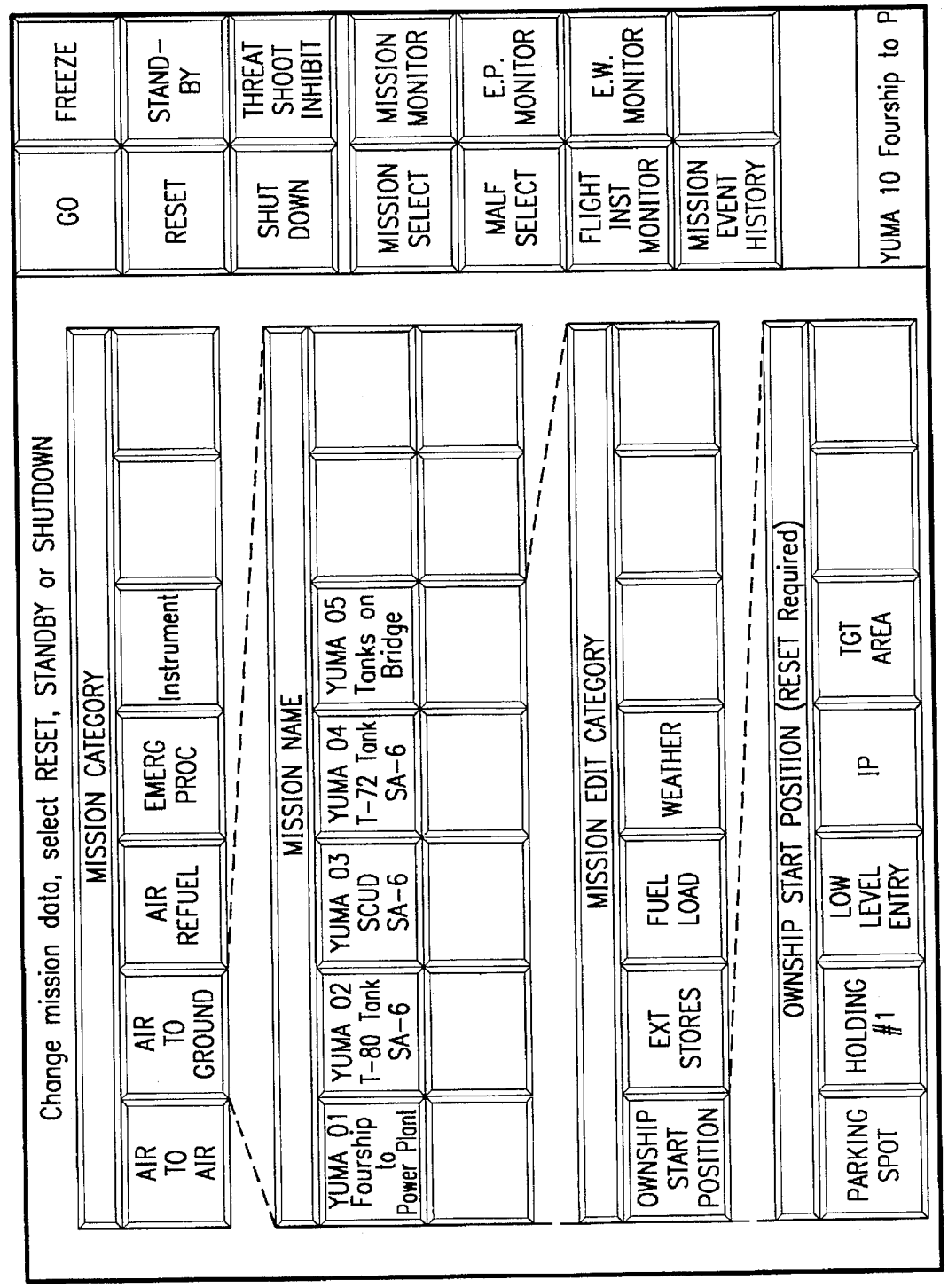
FIG. 3 illustrates a user interface allowing for changing of the starting point of a training scenario according to the teachings of the present invention.

FIG. 3 illustrates another example of a display of user interface according to the teachings of the present invention. As shown in FIG. 3, the selected category from the highest hierarchal level in this example is the air-to-ground category. Several particular air-to-ground scenarios are then presented, corresponding to various air-to-ground operations that are available on the simulator. The illustrated examples include ground targets such as a power plant, a T-80 tank, a scud installation, a T-72 tank, and tanks on a bridge.

In this example, the selected edit category is the ownship start position category, and thus several ownship start position units are presented including "PARKING SPOT," "HOLDING PATTERN NUMBER ONE," "LOW LEVEL ENTRY," "TARGET AREA," and "IP" (initial point prior to the target area). Each of the choices are prepackaged units which avoid the need for detailed entry of information on the particular location of the aircraft. By selecting one of these units, the training system is quickly configured for a new geographical position for the aircraft at the start of the training scenario.

Figure 4:
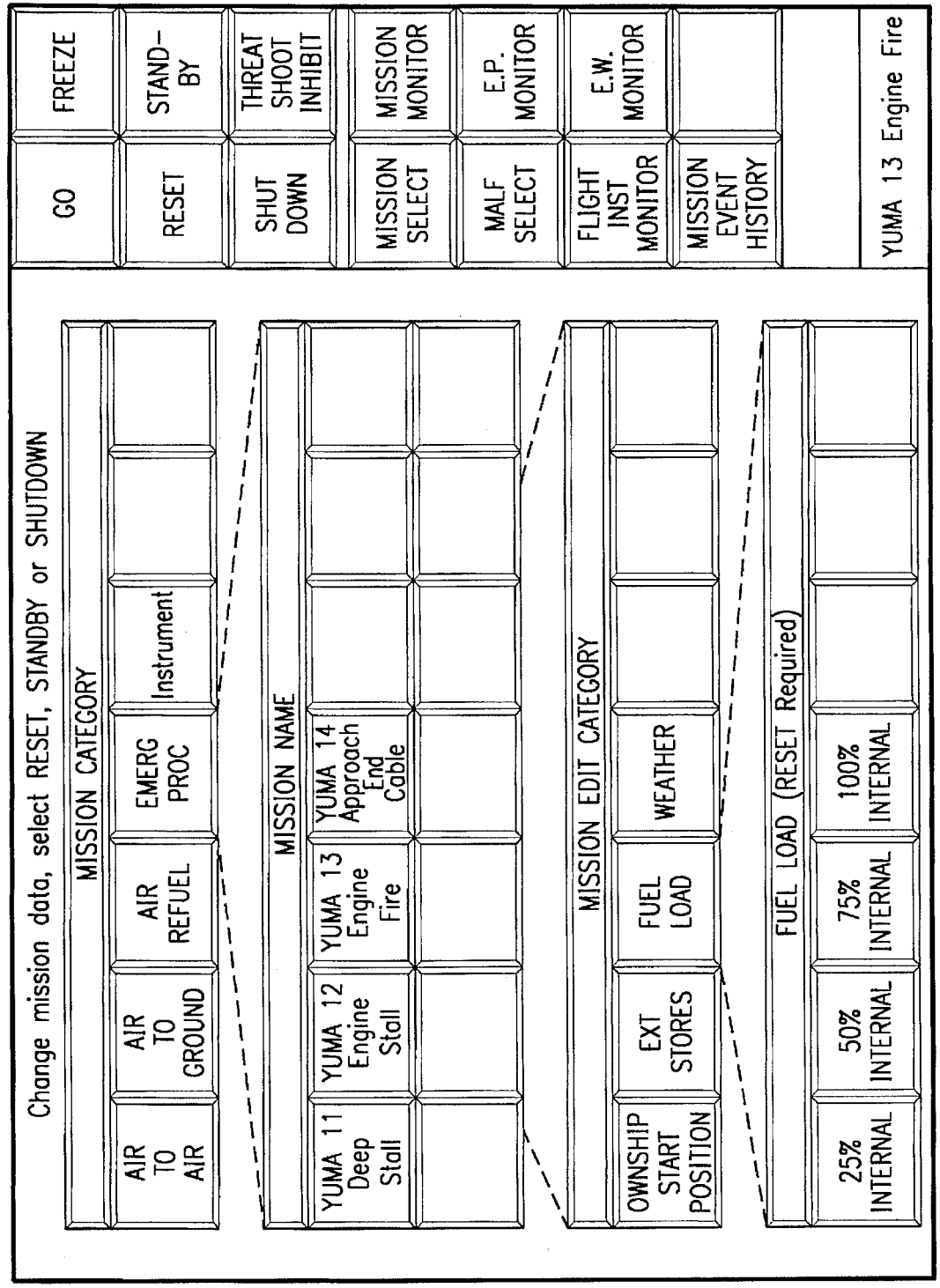
FIG. 4 illustrates a user interface allowing for changing of fuel loads according to the teachings of the present invention.

FIG. 4 illustrates another example of a display of a user interface according to the teachings of the present invention. As illustrated in FIG. 4, the emergency procedure category is initially selected, and the detailed parameter category to be edited is the fuel load. As shown in FIG. 4, various fuel load units are presented, for example 25% internal, 50% internal, 75% internal, and 100% internal, corresponding to different levels of fuel.

Another feature of the present invention includes the use of graphical displays such as charts and graphs to allow for the efficient selection of detailed parameters for use in setting training scenarios. The particular example shown in FIG. 5 corresponds to the selection of "EXT STORES" edit category shown in FIGS. 2, 3, and 4. It should be understood, however, that this illustration is exemplary only, and that other edit categories may make use of such graphical representations.

Figure 5:
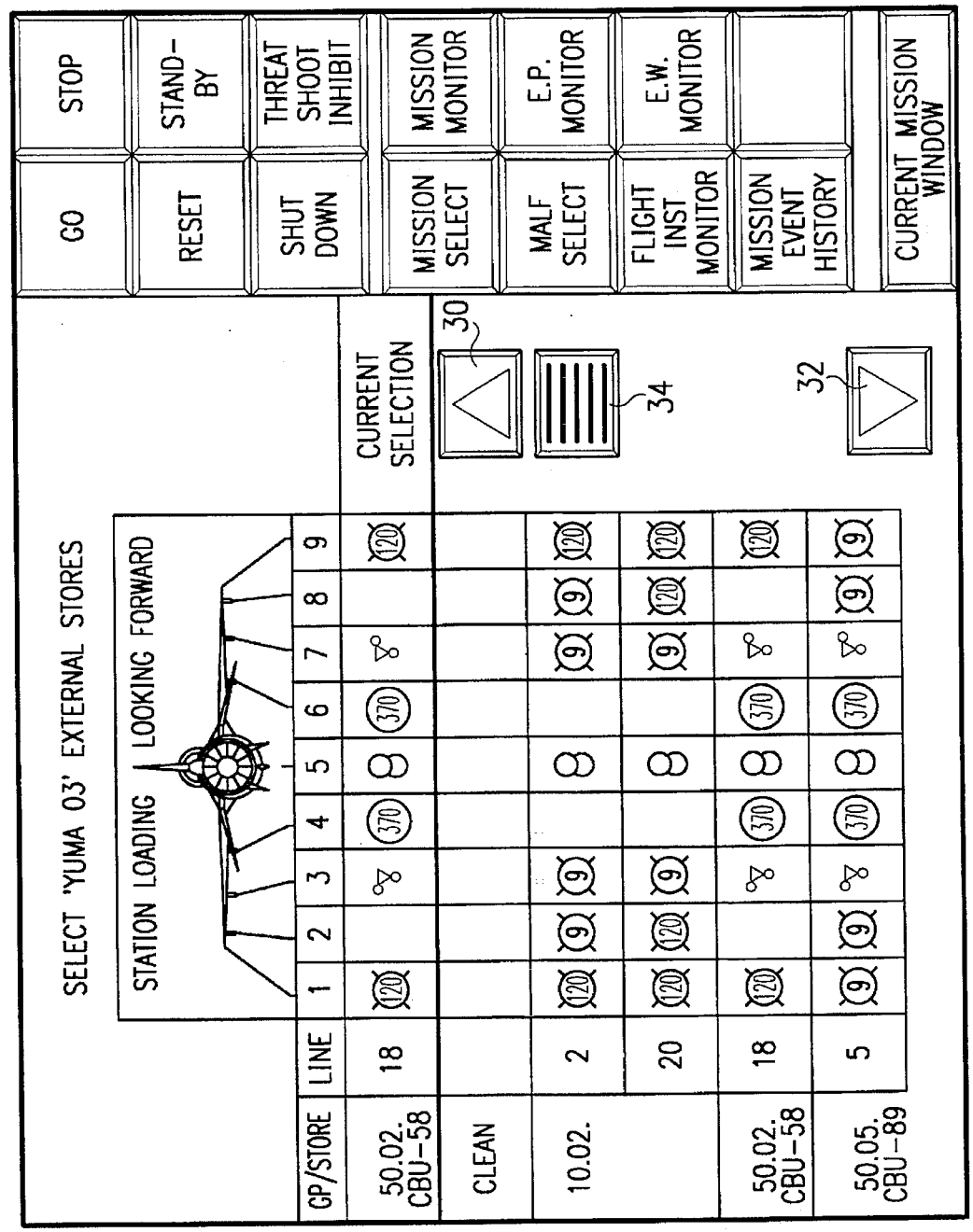
FIG. 5 illustrates a user interface allowing for changing of weapons loads according to the teachings of the present invention.

The display shown in FIG. 5 corresponds to particular weapons loads that are available for the aircraft being simulated. As shown in FIG. 5, the weapons load choices are presented as weapons load lines related to a graphic of the fighter craft. This graphic may correspond to written operations manuals, or other written procedures, that the trainees may be familiar with, and thus advantage is taken of the trainees' familiarity with the written materials, and the trainees' understanding of the written material is reinforced through its use on the flight simulator.

As shown in FIG. 5, a particular weapons load is selected by selecting the appropriate line. This selection can be performed by selecting the appropriate box in the column labelled "line." This box can be selected, for example, by touching a touch screen, or using a mouse or keyboard, among other input devices. The selected line can also be highlighted. Furthermore, the appropriate line can be selected by selecting any place on the appropriate line, not just the "line box." It should be understood that selection of the lines can be accomplished in other ways as well without departing from the intended scope herein. Scroll bottoms 30, 32, and 34 are used to scroll up and down between all available lines. Only a few of the many possible weapons loads are shown in FIG. 5. For example, by scrolling up, additional weapons load lines will appear on the display 16.

Figure 6:
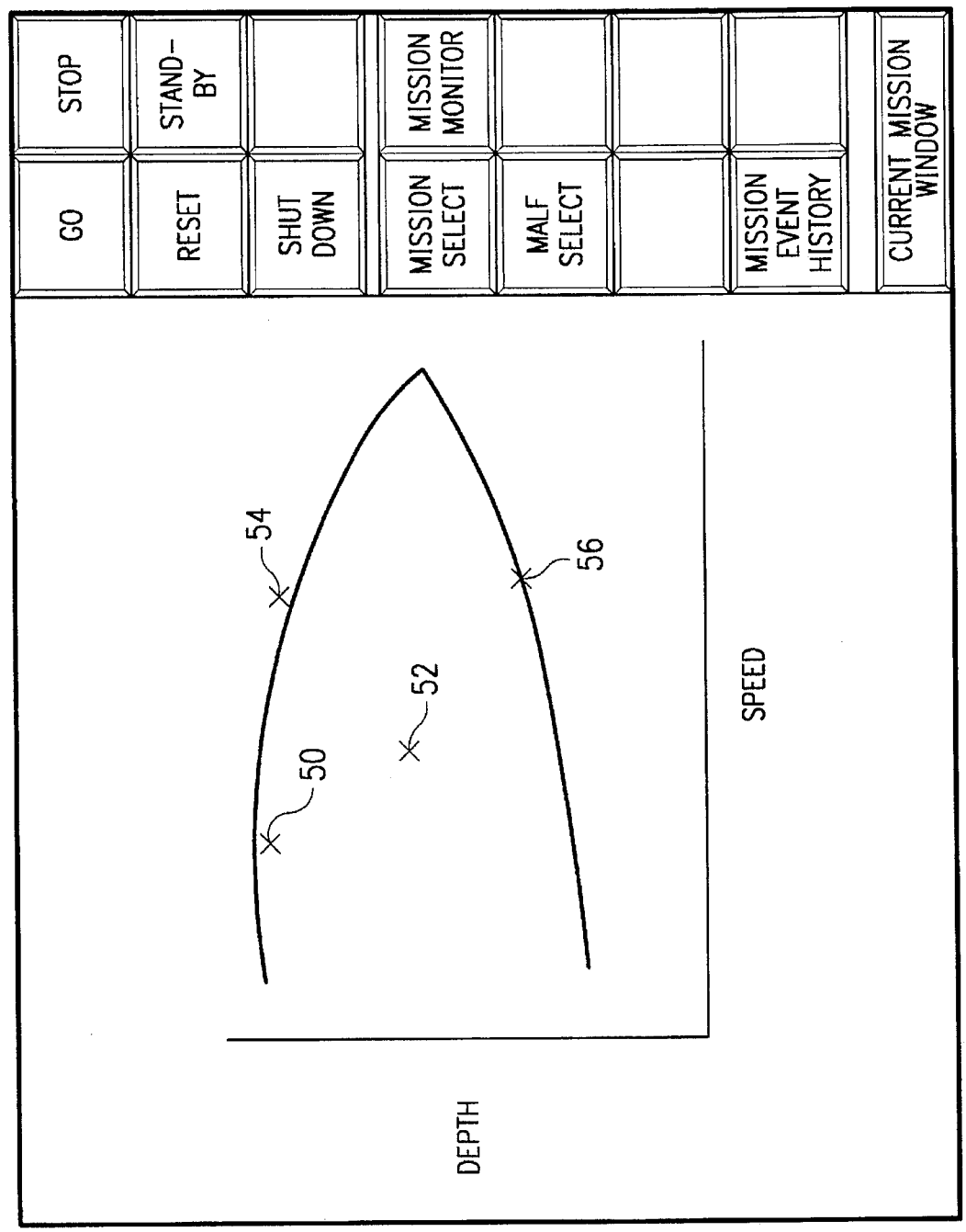
FIG. 6 illustrates a user interface including a graphical representation for use in changing simulator parameters according to the teachings of the present invention.

FIG. 6 illustrates another exemplary graphic that can be used in setting detailed parameters of a particular training scenario. The example shown in FIG. 5 corresponds to a training simulator for a submarine. In this example, the setup of the depth and speed can be accomplished through the use of the graphical display of FIG. 6 rather than through the textual entry of such information. With the display shown in FIG. 6, a trainee or instructor may simply select any location on the chart, and the depth and speed being simulated by the training system will correspond to the points selected on the graph. For example, locations 50–56 represent various selectable points of operation within, on the edge of, and outside the envelope of the graph shown on the display of FIG. 6.

The examples of FIGS. 5 and 6 are illustrative only. Many other charts, graphs, maps, or other graphical representation can be used as well. For example, for "OWNSHIP START POSITION," a 3-D map can be displayed, and choosing a location on the map will set the initial position of the scenario.

Figure 7:
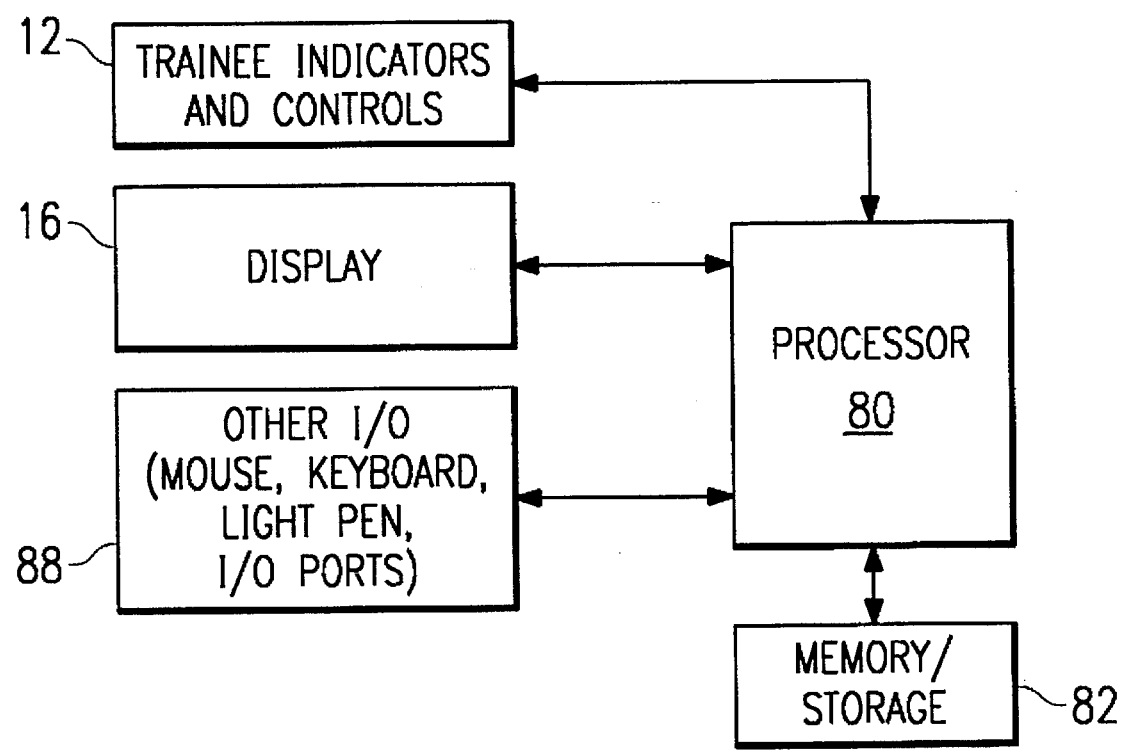
FIG. 7 illustrates a block diagram of a training system according to the teachings of the present invention.

FIG. 7 illustrates a block diagram of a control system for controlling a training system 10 according to the teachings of the present invention. As shown in FIG. 7, a processor 80 is coupled to memory/storage 82, indicators and controls 12, display 16, and other I/O 88.

The processor 80 may comprise a microprocessor, computer system (such as a personal computer), or any other computer or processing system suitable for executing instructions for implementing a control system. As an example, an R4000 based multiprocessor system from the Silicon Graphics company may be used to control and operate the training system 10. In operation, processor 80 operates on instructions, which may be stored, for example, in memory/storage 82. Memory/storage 82 may be part of the system that comprises processor 80. The instructions executed by processor 80 include a training program for presenting simulated operations that correspond to the operating conditions selected through interaction with display 16. Memory/storage 82 may include random access memory, read only memory, magnetic storage media, among others. Instructions and data may be retrieved from and stored in memory/storage 82.

Processor 80 also controls and receives input from the indicators and controls 12. Such indicators and controls include switches, gauges, meters, heads-up displays, visual displays (such as terrain and horizon views) and any other such devices that are used as part of a training system. For example, with a flight simulator, the trainee indicators and controls will include all of the cockpit equipment that the trainee has at his disposal, as well as the visual display used to show the terrain and horizon.

Processor 80 is also coupled to display 16. As discussed above, display 16 includes the graphical representations of the preprogrammed units and operating conditions that are used to increase the efficiency and effectiveness of the training system. Display 16 may be a touch screen.

Other I/O 88 includes other input/output devices used to communicate with processor 80, such as a mouse, keyboard, light pen, or other I/O ports. Such controls are provided to allow processor 80 to control the operation of the training system in ways alternative to a touch screen.

In summary, a method and an apparatus for controlling a simulator have been provided in which detailed parameters associated with particular training scenarios are preprogrammed into selectable units. These selectable units are displayed on graphical display and can be easily selected for quick and efficient setup of different training scenarios, thereby avoiding inefficient delays associated with entry of such detailed parameter information. Furthermore, the setup of detailed parameters can be accomplished through the use of graphical representations, such as charts, graphs, and maps.

Although the present invention has been described in detail, it should be understood that various changes, substitutions, or additions may be made without departing from the intended scope as defined by the appended claims.

What is claimed is:

1. A training system for training a trainee by simulating the operation of an avionics system, comprising:

a trainee interface operable to interface the training system with the trainee, the trainee interface further comprising controls with which the trainee can control the training system to simulate the avionics system operation;

a processor coupled to the trainee interface and operable to execute a training program to control the training system; and a display coupled to the processor, the display operable to display representations of preprogrammed units, each of the preprogrammed units including a collection of detailed parameters for simulating operation conditions not controlled by the trainee during operation of the training system, such that selection of one of the representations prior to executing the training program, by using the display, sends instruction to the processor that results in configuring the training system according to the detailed parameters of the unit associated with the selected representation to simulate avionics system operation under the selected parameters.

2. The training system of claim 1, wherein one of the units includes a collection of weather parameters.

3. The training system of claim 1, wherein the training system comprises a flight simulator.

4. The training system of claim 3, wherein one of the units includes a collection of weapons load parameters.

5. The training system of claim 4, wherein the representations are presented in a weapons load chart.

6. The training system of claim 3, wherein one of the units includes a collection of fuel load parameters.

7. The training system of claim 3, wherein one of the units includes a collection of starting position parameters.

8. The training system of claim 1, wherein the representations comprise icon buttons.

9. The training system of claim 1, wherein the representations are presented through a chart.

10. The training system of claim 1, wherein the representations are presented through a graph.

11. A method of training a trainee by simulating the operation of an avionics system, comprising:

interfacing a training system with a trainee;

controlling the training system by means of controls operated by the trainee;

displaying representations of preprogrammed units on a display, each preprogrammed unit including a collection of detailed parameters for simulating avionics system operating conditions not controlled by the trainee during operation of the training system;

selecting one of the representations via the display prior to controlling the training system; and configuring the training system according to the detailed parameters of the unit associated with the selected representation to simulate avionics system operation under the selected parameters during training system operation.

12. The method of claim 11, wherein one of the units includes a collection of weather parameters.

13. The method of claim 11, wherein the training system comprises a flight simulator.

14. The method of claim 13, wherein one of the units includes a collection of weapons load parameters.

15. The method of claim 14, wherein displaying comprises presenting the representations in a weapons load chart.

16. The method of claim 13, wherein one of the units includes a collection of fuel load parameters.

17. The method of claim 13, wherein one of the units includes a collection of starting position parameters.

18. The method of claim 13, wherein displaying comprises presenting the representations through a map, selecting a location on the map resulting in setting of initial position.

19. The method of claim 11, wherein displaying comprises presenting the representations through a chart.

20. The method of claim 11, wherein displaying comprises presenting the representations through a graph.

* * * * *